United States Patent
Klein, Jr. et al.

(10) Patent No.: US 9,532,546 B1
(45) Date of Patent: Jan. 3, 2017

(54) URINE PAD WITH AUTOMATICALLY DEPLOYED THREE DIMENSIONAL TARGET

(71) Applicant: ROCKY & MAGGIE'S PET PRODUCTS, INC., Melbourne, FL (US)

(72) Inventors: William W. Klein, Jr., Houston, TX (US); Joseph Klein, Melbourne, FL (US); Karen Klein, Melbourne, FL (US)

( * ) Notice: Subject to any disclaimer, the term of this patent is extended or adjusted under 35 U.S.C. 154(b) by 0 days.

(21) Appl. No.: 14/862,920

(22) Filed: Sep. 23, 2015

(51) Int. Cl.
*A01K 1/01* (2006.01)
*A01K 1/015* (2006.01)

(52) U.S. Cl.
CPC ........... *A01K 1/0152* (2013.01); *A01K 1/0125* (2013.01); *A01K 1/0157* (2013.01)

(58) Field of Classification Search
CPC ...... A01K 1/01; A01K 1/0103; A01K 1/0107; A01K 1/0125
USPC .......... 119/161, 163, 168, 169, 171
See application file for complete search history.

(56) References Cited

U.S. PATENT DOCUMENTS

| | | | |
|---|---|---|---|
| 1,773,141 A | 8/1930 | Hodgson | |
| 2,230,861 A | 2/1941 | Buehler | |
| 3,339,527 A * | 9/1967 | Burroughs | A01K 1/0107 119/169 |
| 3,626,899 A | 12/1971 | Spellman | |
| 3,752,121 A | 8/1973 | Brazzell | |
| 4,047,499 A * | 9/1977 | Janecek | A01K 1/0107 119/168 |
| 4,147,129 A * | 4/1979 | Ruplen | A01K 1/0353 119/169 |
| 4,715,320 A | 12/1987 | Barnhart | |
| 4,800,677 A | 1/1989 | Mack | |
| D307,201 S | 4/1990 | Gold | |
| 4,986,218 A | 1/1991 | Cassone | |
| 5,080,046 A | 1/1992 | Cassone | |
| 5,085,174 A * | 2/1992 | Etkin | A01K 1/0107 119/169 |
| 5,482,007 A | 1/1996 | Kumlin | |
| 5,983,538 A * | 11/1999 | Crowell | G09F 1/08 40/124.14 |
| 6,079,363 A | 6/2000 | MacLaine | |
| 6,129,050 A | 10/2000 | Carbajal | |

(Continued)

FOREIGN PATENT DOCUMENTS

| | | |
|---|---|---|
| EP | 0852111 A1 | 7/1998 |
| EP | 2499906 A1 | 9/2012 |

(Continued)

*Primary Examiner* — David Parsley

(57) ABSTRACT

A urine pad has a foundation layer and a target structure. The foundation layer has a first horizontal fold line to divide the foundation layer into a first and second part, an impermeable backing, and an absorbent covering affixed to the impermeable backing. The target structure has an open length centered on and extending across the first horizontal fold line and first and second attachment points. The first attachment point is attached to the first part at a first anchor point essentially one half the open length from the first horizontal fold line and the second attachment point is attached to the second part at a second anchor point disposed essentially the open length away from the first anchor point. The target structure is configured to be placed in a storage position when the foundation layer is folded configuration in a functional position when the foundation layer is opened.

20 Claims, 7 Drawing Sheets

(56) References Cited

U.S. PATENT DOCUMENTS

| | | | |
|---|---|---|---|
| 6,227,145 B1 | 5/2001 | Miyamoto et al. | |
| 6,244,216 B1 | 6/2001 | Ochi | |
| 6,460,484 B2 | 10/2002 | Ikegami et al. | |
| 7,249,570 B1 | 7/2007 | Roberson | |
| D615,256 S | 5/2010 | Emerson | |
| 7,753,753 B2 * | 7/2010 | Payne | A63H 33/42 446/478 |
| 8,127,717 B1 | 3/2012 | Trodella | |
| 8,225,748 B2 | 7/2012 | Crawford | |
| 8,468,973 B2 | 6/2013 | Sasano et al. | |
| 8,881,679 B1 | 11/2014 | Pelkey | |
| D718,907 S | 12/2014 | Calimano et al. | |
| 2005/0263096 A1 * | 12/2005 | Mita | A01K 1/035 119/706 |
| 2006/0191488 A1 | 8/2006 | Ricchiuti | |
| 2006/0260556 A1 | 11/2006 | Renforth | |
| 2007/0179468 A1 | 8/2007 | LaBelle | |
| 2008/0083377 A1 | 4/2008 | Hurwitz | |
| 2008/0223301 A1 | 9/2008 | Nagao | |
| 2008/0236504 A1 | 10/2008 | Silverman | |
| 2008/0251026 A1 | 10/2008 | Bell et al. | |
| 2009/0095224 A1 | 4/2009 | Cooper | |
| 2010/0175626 A1 | 7/2010 | Askinasi | |
| 2011/0139082 A1 | 6/2011 | Blagden | |
| 2012/0132146 A1 | 5/2012 | Cheng | |
| 2012/0132147 A1 | 5/2012 | Cheng | |
| 2012/0152175 A1 | 6/2012 | Li | |
| 2014/0137805 A1 | 5/2014 | Sasano et al. | |
| 2014/0261208 A1 | 9/2014 | Calimano et al. | |
| 2014/0283752 A1 | 9/2014 | Lowe | |
| 2014/0326191 A1 | 11/2014 | Qiu | |
| 2015/0164039 A1 | 6/2015 | Miller | |
| 2015/0164041 A1 | 6/2015 | Takahashi et al. | |

FOREIGN PATENT DOCUMENTS

| | | |
|---|---|---|
| JP | 2003070369 A | 3/2003 |
| JP | 2005013182 A | 1/2005 |
| JP | 2011177167 A | 9/2011 |
| WO | WO 2006093568 A2 | 9/2006 |

* cited by examiner

URINE PAD WITH AUTOMATICALLY DEPLOYED THREE DIMENSIONAL TARGET

FIELD OF THE INVENTION

The present invention relates to disposable absorbent pads for animal urine. In particular, the present invention relates to a foldable absorbent mat that forms a three dimensional structure centered on the mat when unfolded and tensioned.

BACKGROUND OF THE INVENTION

Pet ownership and in particular, the owning and maintaining of dogs is popular throughout many areas of the world. Responsibilities associated with dog and other types of pet ownership include the providing of adequate facilities that enable a dog to exercise and also to deposit the animal's waste products. A dog may frequently urinate throughout a given period in order to properly eliminate biological waste. In addition, "territory marking" is a common habit of male dogs and may occur relatively frequently in both an indoor and outdoor environment due to the animal's natural instincts.

Accordingly, in order to provide adequate facilities for the elimination of waste, dogs and other types of pets may be walked or otherwise provided access to the outdoors. However, many pet owners are unable to provide access to the outdoors for the purpose of waste elimination. This may be because pet owners are away from home for extended periods of time and are unable to walk their pets outside in a timely manner. This may also be because pet owners live in urban, cold or otherwise inhospitable or inconvenient environments and prefer to train their pets to eliminate waste indoors to avoid encountering the elements or inhospitable environments. This may also be because many local agencies have enacted ordinances or regulations which restrict or otherwise regulate tethering of the animal and the disposal of waste products eliminated by a pet. Accordingly, absent the availability of an enclosed backyard or other outdoor area in a pleasant, convenient environment, suitable for waste elimination, there may be numerous occurrences throughout the day when a male dog's natural tendency is either to demonstrate its dominance over a specific territory or otherwise relieve itself through urination.

More specifically, male dogs often "mark" objects that are new and brought into the home or other area occupied by the animal. As set forth above, such "urine marking" is a natural instinct of many male dogs in order to demonstrate "ownership" of a given indoor or outdoor area. The inherent drive of a male dog to perform such territorial marking is a natural instinct and accordingly may be a difficult habit to overcome. Marking behavior is particularly troublesome when is occurs indoors or in other inappropriate areas which may be commonly occupied or frequently accessed by the animal's owners or other humans.

Accordingly, there is a need in this area for a waste station or similar device specifically structured to facilitate the collection of urine which satisfies a male dog's natural instincts, but which eliminates or significantly reduces the possibility of damage being done to surrounding objects such as furniture, floors, or the like. A preferred waste station should also be configured to accommodate the natural "leg lifting" tendencies of male dogs thereby facilitating the use of such a waste station and satisfying a male dog's natural tendency to mark its territory or alternatively to collect periodically deposited urine. There is a need for such a waste station to be convenient for a human to operate or deploy. Additionally, there is a need for such a waste station to eliminate or reduce human contact with the pet waste.

SUMMARY OF THE INVENTION

An embodiment of the invention, as shown and described by the various figures and accompanying text, provides an apparatus for collection of dog urine. The urine pad may have a target structure disposed atop a foundation layer. The target structure may be three-dimensional and rise up away from the foundation layer. The target structure may be configured and secured to the foundation layer in such a way to lay flat against the foundation layer when it is folded flat for storage and "pop-up" away from the foundation layer when the foundation layer is unfolded and lain flat. In this open configuration, the urine pad may be used utilized by dogs, particularly male dogs, when urinating. The target structure may collect, absorb, or otherwise contain urine excreted by the dog. The three-dimensional configuration of the target structure may be particularly helpful to hygienically collect and dispose urine released by a male dog when lifting his leg.

The foundation layer may have an impermeable backing that may be covered by an absorbent pad, which may then be covered by an absorbent covering. In some embodiments, the absorbent pad may be absent and the absorbent covering may provide the function and structure of the absorbent pad. The impermeable backing may be constructed from a material that prevents a fluid such as, by way of example, but not as a limitation, urine, water, blood, or the like, from passing through the material. The impermeable backing will be laid flat on a supporting surface when the urine pad is in use.

The target structure may sit atop the foundation layer and straddle a first horizontal fold line, which separates the foundation layer into a first and second part. The foundation layer may be folded over on itself along the first horizontal fold line. Such a folding may cause a target structure disposed on the foundation layer to move from a "popped-up," upright position to a flattened position. Upon unfolding the foundation layer and placing it in a flat position along a support surface, the target structure may assume a "popped-up," upright position.

The target structure may be permanently affixed to the foundation layer at attachment points. The location and configuration of these attachment points may facilitate the automatic pop-up and collapse of the target structure upon flattening and folding the foundation layer. The target structure may have a second horizontal fold line, which may facilitate the pop-up and collapse of the target structure. The target structure may also have first and second vertical fold lines disposed on first and second sides of the structure to facilitate the pop-up and collapse of the target structure.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
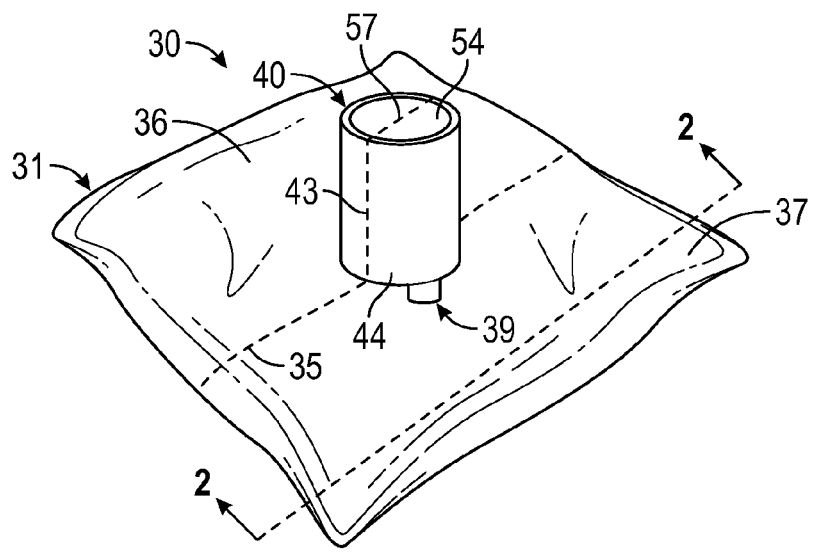
FIG. 1 is a top perspective view of a urine pad according to an embodiment of the present invention.

An embodiment of the invention, as shown and described by the various figures and accompanying text, provides a urine pad 30. As depicted in FIG. 1, the urine pad 30 may have a target structure 40 disposed atop a foundation layer 31. The target structure 40 may be three-dimensional and rise up, away from the foundation layer 31 providing a target upon which a male dog may urinate in the "leg lifted" position.

Figures 5A, 5B:
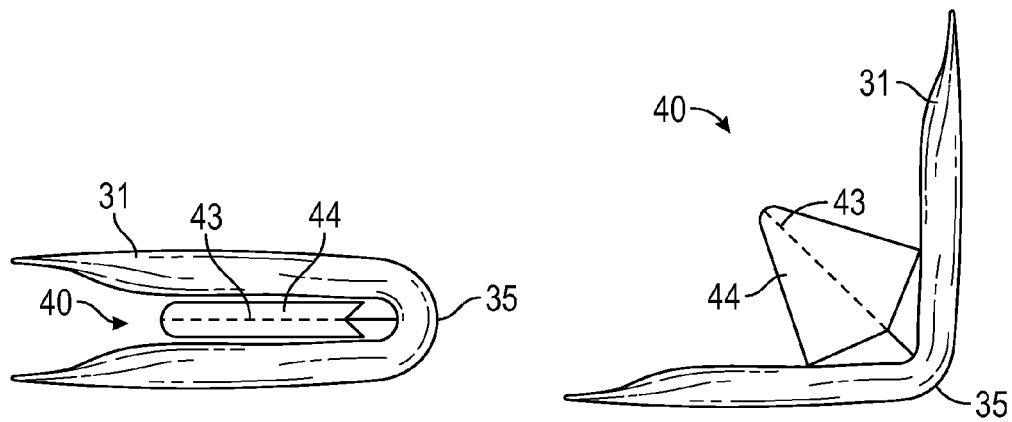
FIG. 5A is a side elevation view of the urine pad illustrated in FIG. 1 in a folded configuration.
FIG. 5B is a side elevation view of the urine pad illustrated in FIG. 1 in a partially open configuration.

As shown in FIG. 5A, the target structure 40 may be configured and secured to the foundation layer 31 in such a way to allow the foundation layer 31 and integrated target structure 40 to be folded flat for storage. This may be referred to as a folded configuration. FIG. 5B depicts the target structure 40 and foundation layer 31 in a partially open configuration. This configuration is encountered when transitioning from the folded configuration depicted in FIG. 5A to the open configuration depicted in FIG. 6A. The partially open configuration is also encountered when transitioning from the open configuration depicted in FIG. 6A back to the folded configuration depicted in FIG. 5A.

As shown in FIG. 1, the foundation layer 31 may be unfolded and lain flat. Positioning the foundation layer 31 in this way may cause the target structure 40 to extend up and away from the foundation layer. This may be referred to as an open configuration. In an open configuration, the urine pad 30 may be used utilized by dogs, particularly male dogs, when urinating. The target structure 40 may collect, absorb, or otherwise contain urine excreted by the dog. The three-dimensional configuration of the target structure 40 may be particularly helpful to hygienically collect and dispose urine released by a male dog when lifting his leg.

Figure 2:
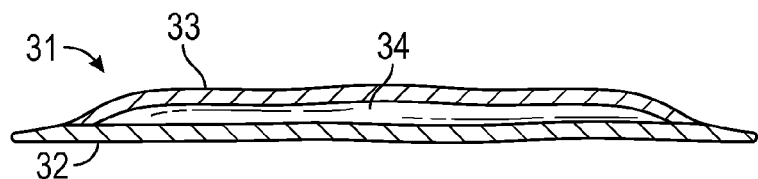
FIG. 2 is a cross-section of a foundation layer of the urine pad illustrated in FIG. 1 and taken through line 2-2 in FIG. 1.

As shown in FIG. 2, the foundation layer 31 may be formed from at least two distinct layers. Some embodiments may have three or more distinct layers. An impermeable backing 32 may be covered by an absorbent pad 34, which may be covered by an absorbent covering 33. In an embodiment of the present invention without an absorbent pad 34, including embodiments with only two layers, the absorbent covering 33 may provide the functions of the absorbent pad 34.

The impermeable backing 32 may be constructed from a material that substantially prevents a liquid such as, by way of example, but not as a limitation, urine, water, blood, or the like, from passing through the material. The impermeable backing 32 may be constructed from, by way of example, and not as a limitation, plastic or the like. Those skilled in the art will appreciate that some materials may allow a portion of liquid to permeate given the passage of sufficient time or the presence of sufficient liquid. However, these materials may prevent the passage of significant quantities of liquid when the liquid is present for a limited duration. Materials with these characteristics may be referred to as impermeable.

An absorbent pad 34 may cover the entirety, or a portion, of the impermeable backing 32. In one embodiment, the absorbent pad 34 may cover a central area of the impermeable backing 32, leaving a margin of the impermeable backing 32 around the absorbent pad 34 uncovered. The absorbent pad 34 may adhere to the impermeable backing 32 at any location at which they contact one another. The absorbent pad 34 may adhere to the impermeable backing 32 along the entirety of the contact area between the two. In one embodiment, the absorbent pad 34 may adhere to the impermeable backing 32 along the perimeter of the contact area between the two. In yet another embodiment, the absorbent pad 34 may not adhere to the impermeable backing 32.

An absorbent covering 33 may be placed over the impermeable backing 32. The absorbent covering 33 may be used with or without an absorbent pad 34. In embodiments without an absorbent pad 34, it may be desirable to have an absorbent covering 33 capable of absorbing more fluid than would be necessary in configurations utilizing both an absorbent covering 33 and an absorbent pad 34.

The absorbent covering 33 may adhere directly to the absorbent pad 34 at any location at which they contact one another. The absorbent covering 33 may adhere to the absorbent pad 34 along the entirety of the contact area between the two. In one embodiment, the absorbent covering 33 may adhere to the absorbent pad 34 along the perimeter of the contact area between the two. In yet another embodiment, the absorbent covering 33 may not adhere to the absorbent pad 34.

The absorbent covering 33 may contact the impermeable backing 32 at locations at which the absorbent pad 34 does not extend across the impermeable backing 32. In embodiments in which the absorbent covering 33 contacts the impermeable backing 32, the absorbent covering 33 may adhere to the impermeable backing 32. The absorbent covering 33 may adhere to the impermeable backing 32 at any location at which they contact one another. The absorbent covering 33 may adhere to the impermeable backing 32 along the entirety of the contact area between the two. In one embodiment, the absorbent covering 33 may adhere to the impermeable backing 32 along the perimeter of the contact area between the two. In one embodiment, the absorbent pad 34 may be captured between the impermeable backing 32 and the absorbent covering 33 but not adhere to either.

Figure 3:
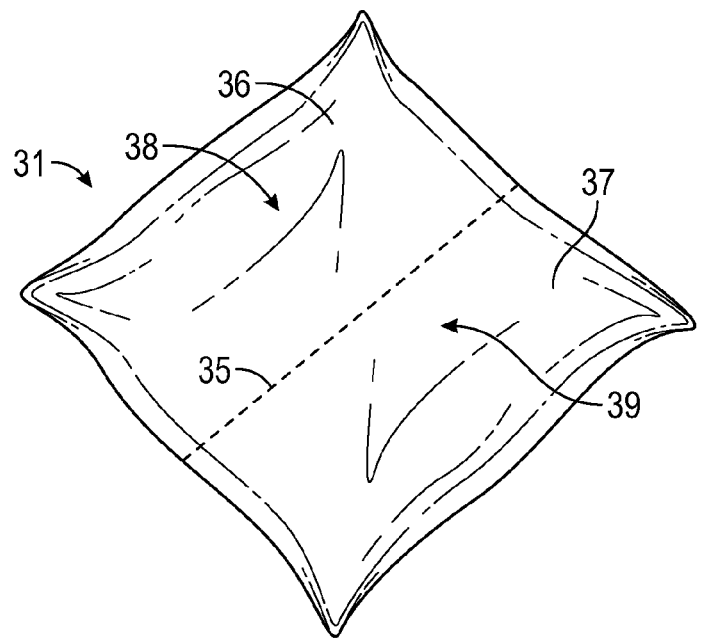
FIG. 3 is a top view of the foundation layer of the urine pad illustrated in FIG. 1.

As shown in FIG. 3, the foundation layer 31 may have a first horizontal fold line 35 disposed along the foundation layer 31. In one embodiment, the first horizontal fold line 35 may be disposed along a midline of the foundation layer 31. The first horizontal fold line 35 may separate the foundation layer 31 into a first part 36 and a second part 37. In one embodiment, the first part 36 and the second part 37 may be of similar size and configuration.

The top layer of the foundation layer 31, which may be the absorbent covering 33, may have a first anchor point 38 and a second anchor point 39. The first anchor point 38 may be on the first part 36 and the second anchor point 39 may be on the second part 37. The target structure 40 may be secured to these anchor points 38, 39.

Figure 8:
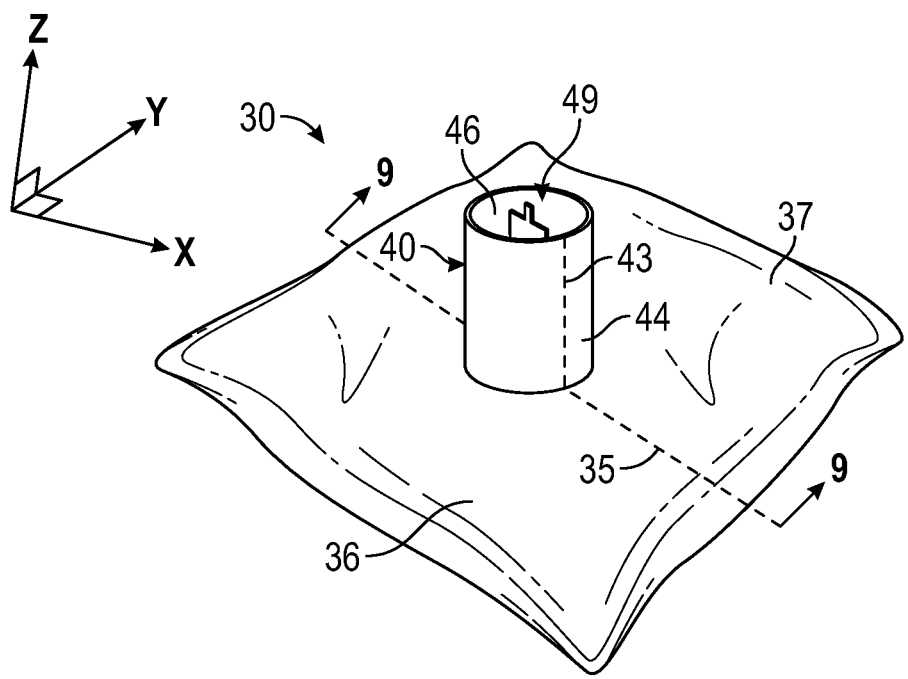
FIG. 8 is a top perspective view of a urine pad in an open configuration according to an embodiment of the present invention.

The foundation layer 31 may occupy a plane in the X and Y directions as depicted in FIG. 8. The target structure 40 may extend from the foundation layer 31 in the Z direction.

The target structure 40 may sit atop the urine pad 30. The target structure 40 may collapse into a storage position when the foundation layer 31 is placed into a folded configuration, as shown in FIG. 5A and FIG. 6C. The target structure 40 may rise into a functional position when the foundation layer 31 is placed into an open configuration, as shown in FIG. 1. The foundation layer 31 may be folded over itself one or more times when in the folded configuration. In one embodiment, the foundation layer 31 may be folded in half along the first horizontal fold line 35 in a lengthwise direction and folded in half again in a widthwise direction to assume the folded configuration. In another embodiment, the foundation layer 31 may be folded in half along the first horizontal fold line 35 in a lengthwise direction and folded in thirds in a widthwise direction to assume the folded configuration. Folding the foundation layer 31 along the first horizontal fold line 35 may place the urine pad 30 in a folded configuration. Subsequent folding of the foundation 31 may be in halve, thirds, quarters, fifths, or the like, in either a lengthwise or widthwise direction.

The target structure 40 may lay flat when the foundation layer 31 is folded along the first horizontal fold line 35. The target structure 40 may be folded within the foundation layer 31 when in the folded configuration. The target structure 40 may be said to be in a storage position when it is folded within the foundation layer 31 and a folded configuration.

The foundation layer 31 may be unfolded and lain flat with the impermeable backing 32 disposed on a support structure such as, by way of example, but not as a limitation, the floor, the ground, or the like, when in the open configuration. Such a configuration of the foundation layer 31 may place the target structure 40 in a functional position. In the functional position, the target structure 40 may "pop-up" or otherwise extend from the foundation layer 31. The term "pop-up" may mean that the target structure 40 may automatically deploy or rise away from the foundation layer 31 upon unfolding the foundation layer 31 or laying the foundation layer 31 flat on a supporting surface.

Figure 4:
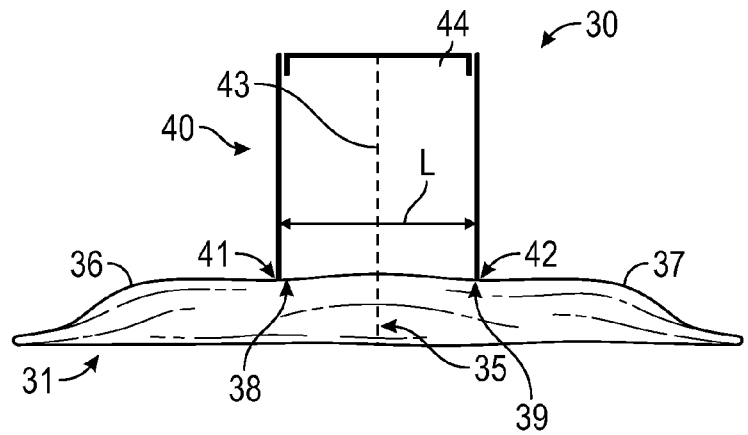
FIG. 4 is a right side elevation view of the urine pad illustrated in FIG. 1 in an open configuration.

As show in FIG. 4, the target structure 40 may have a first attachment point 41 and a second attachment point 42. The first attachment point 41 and the second attachment point 42 may be disposed along the bottom edge of the target structure 40. The first attachment point 41 may secure to the first anchor point 38. More specifically, the first attachment point may be attached to the first part at the first anchor point. The second attachment point 42 may secure to the second anchor point 39.

Figure 7:
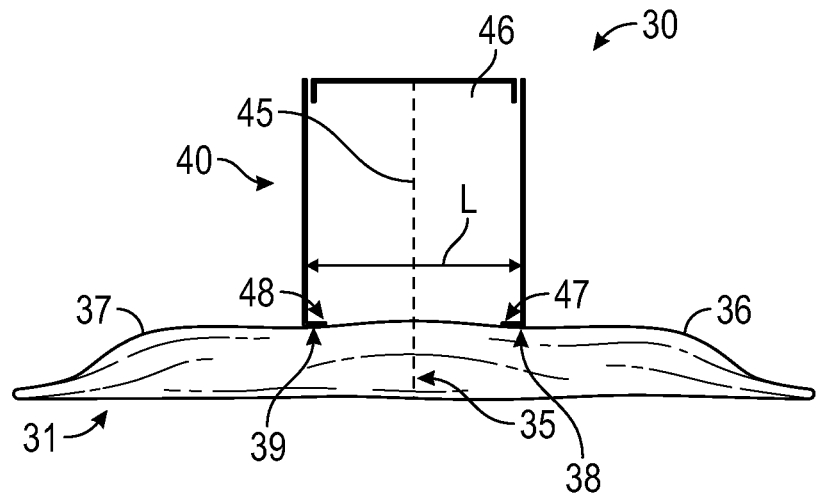
FIG. 7 is a left side elevation view of the urine pad illustrated in FIG. 1 in an open configuration.

As shown in FIG. 7, in one embodiment, connections, including the connections at the first attachment point 41 or the second attachment point 42, may be made using a tab. A tab, including the first target tab 47 and second target tab 48, may be integrated into or attached to the target structure 40. The tab may be a notch extending from an edge of the target structure 40. The tab may have rounded edges or two or more connecting straight edges. The tab may be flexible with respect to the target structure 40. The tabs may be placed at an angle ranging from 0-180° with respect to the target structure 40 surface with which the tab is associated. This angle may change as the target structure 40 moves between the storage position and the functional position. In the storage position, the tab may lay flat against the target structure 40 surface. In one embodiment, in the functional position, the tab may be placed at an angle ranging from 20-180° with respect to the target structure 40 surface with which the tab is associated. In another embodiment, in the functional position, the tab may be placed at an angle ranging from 45-90° with respect to the target structure 40 surface with which the tab is associated. In yet another embodiment, in the functional position, the tab may be placed at a 90° angle with respect to the target structure 40 surface with which the tab is associated. The tabs may extend toward the middle, top, bottom, or outside of the target structure 40.

As depicted in FIG. 7, the target structure 40 may have a first target tab 47 integrated with or attached to a bottom edge of the target structure 40. The target structure 40 may have a second target tab 48 integrated with or attached to a bottom edge of the target structure 40. The first and second target tabs 47, 48, may be flexible with respect to the target structure 40. The first and second target tabs 47, 48 may be placed at a 90° angle with respect to the first and second sides 44, 46 of the target structure 40 when in the functional position and may be placed at a 0° angle with respect to the first and second sides 44, 46 of the target structure 40 when in the storage position. The first and second tabs 47, 48 may extend toward the middle of the target structure 40 or may extend outwardly away from the target structure 40.

The target structure may have an open length L. This open length L may be defined as the distance between the first attachment point 41 and the second attachment point 42 when the target structure 40 is in a functional position. The open length L may extend across the first horizontal fold line 35. The open length L may be perpendicular to the first horizontal fold line 35 when in the functional position. The target structure 40 may be positioned on the foundation layer 31 such that approximately half of the open length L is located on either side of the first horizontal fold line 35. The target structure 40 may be positioned on the foundation layer 31 with essentially one half the open length L on either side of the horizontal fold line 35 when the portion of the open length L of the target structure 40 positioned on either side of the horizontal fold line 35 is equal to 30-70% of the open length L. The first attachment point 41 may be attached to the first part 36 at the first anchor point 38 essentially one half of the open length L away from the first horizontal fold line 35. That is, the first attachment point 41 may be attached to the first part 36 at the first anchor point 38 at a distance in the range 30-70% of the open length L from the first horizontal fold line 35. The second attachment point 42 may be attached to the second part 37 at the second anchor point 39 essentially the open length L away from the first anchor point 38. A distance is essentially the open length L away if it is 80-120% the distance of the open length L.

Figure 11A:
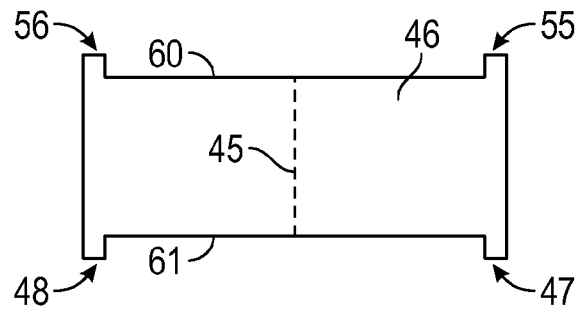
FIGS. 11a-e are front views of a second target side of the urine pads illustrated in FIGS. 1 and 8.
Figure 11B:
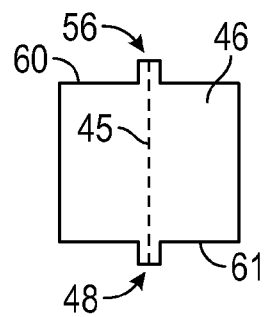
Figure 11C:
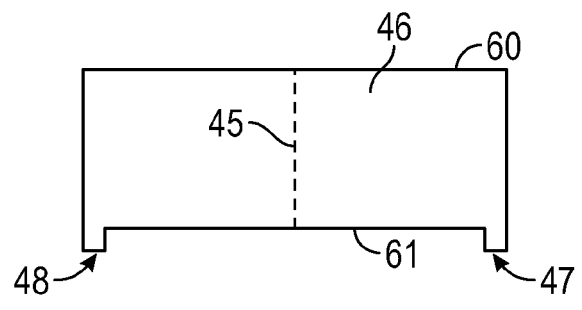
Figure 11D:
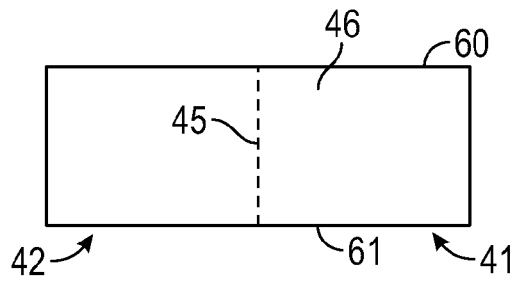
Figure 11E:
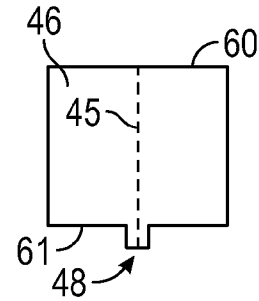

FIGS. 10*a-e* depict possible embodiments of the first target side 44. FIGS. 11*a-3* depict possible embodiments of a second target side 46. These figures are representative embodiments only. The first and second target sides 44, 46 may be integrally affixed to one another to form a continuous loop. The first and second target sides 44, 46 may be integrally affixed to one another along one adjoining edge and secured to one another along the other adjoining edge. As depicted in FIG. 4, the first target side 44 may connect to the second target side 46 along the first and second target side top ends 58, 60. In such a configuration, neither the first or second target side 44, 46 may have a vertical fold line.

As depicted in FIG. 4, the target structure 40 may have a first vertical fold line 43 disposed on a first target side 44 of the target structure 40. The first vertical fold line 43 may be disposed at a midpoint of the first target side 44 of the target structure 40.

As depicted in FIG. 7, the target structure 40 may have a second vertical fold line 45 disposed on a second target side 46 of the target structure 40. The second vertical fold line 45 may be disposed at a midpoint of the second target side 46 of the target structure 40. The first vertical fold line 43 may oppose the second vertical fold line 45.

The first vertical fold line 43 and second vertical fold line 45 may be aligned with the first horizontal fold line 35 and perpendicular to the first horizontal fold line 35. The first horizontal fold line 35 may lie in the plane defined by the X and Y directions. When in the functional position, the first vertical fold line 43 and second vertical fold line 45 may extend from the X and Y plane in the Z direction. The first vertical fold line 43 may be parallel to the second vertical fold line 45. A first point along the first horizontal fold line 35 may contact the end of the first vertical fold line 43 at a location where the target structure 40 contacts the foundation layer 31. A point along the first horizontal fold line 35 may contact the end of the second vertical fold line 45 at a location where the target structure 40 contacts the foundation layer 31.

The first target side 44 may have a first target side top end 58 and a first target side bottom end 59. The first target side bottom end 59 may be attached to the first anchor point 38. This attachment may be made using a first target tab 47. The second target side 46 may have a second target side top end 60 and a second target side bottom end 61. The second target side bottom end 61 may be attached to the second anchor point 39. This attachment may be made using a second target tab 48.

Figure 6A:
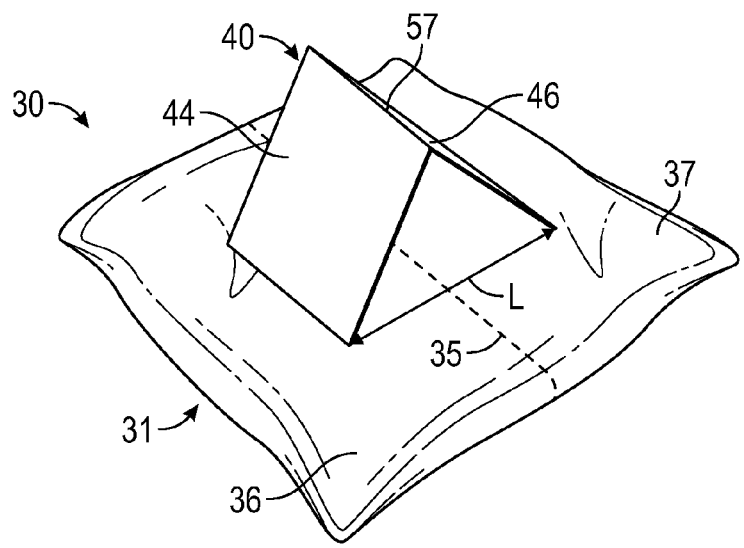
FIG. 6A is a top perspective view of a urine pad according to an embodiment of the present invention.

As depicted in FIG. 6A, the first target side 44 may connect to the second target side 46 at a second horizontal fold line 57. The second horizontal fold line 57 may be aligned with and parallel to the first horizontal fold line. The first horizontal fold line 35 and the second horizontal fold line 57 may share the same coordinates in the X and Y plane. The second horizontal fold line 57 may be located above the first horizontal fold line 35 in the Z direction.

Figure 6B:
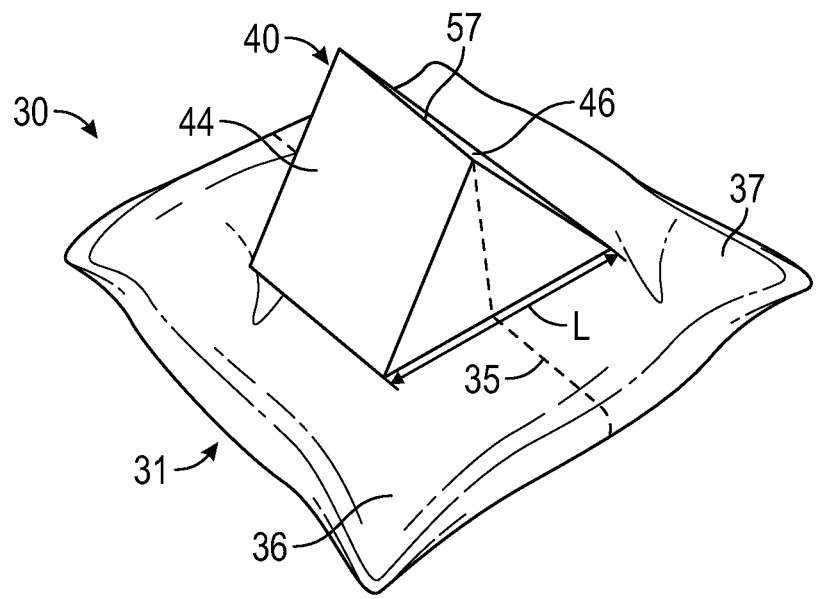
FIG. 6B is a top perspective view of a urine pad according to an embodiment of the present invention.
Figure 6C:
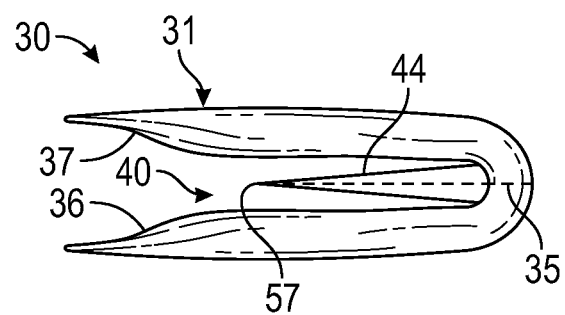
FIG. 6C is a side elevation view of the urine pad illustrated in FIG. 6B in a folded configuration.

As depicted in FIG. 6B, the target 40 may have opposing side walls with fold lines. The target 40 may be stored in the storage position, as depicted in FIG. 6C. In the storage position, the side walls may fold along fold lines disposed thereon.

When in the storage position as shown in FIGS. 5A and 6C, opposing sides of the first target side 44 may move toward one another about the first vertical fold line 43. Similarly, when in the storage position, opposing sides of the second target side 46 may move toward one another about the second vertical fold line 45. The first and second vertical fold lines 43, 45 may move away from one another when moving from the functional position to the storage position. When in the storage position, the first horizontal fold line 35 may extend in the Y direction and be perpendicular to the first vertical fold line 43 and second vertical fold line 45, which may extend in the X direction.

Figure 9:
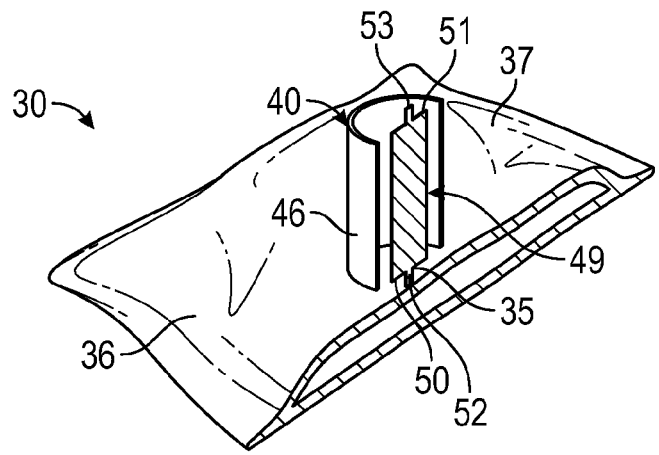
FIG. 9 is a cross-section perspective view of the urine pad illustrated in FIG. 8 in an open configuration and taken through line 9-9 in FIG. 8.
Figure 10A:
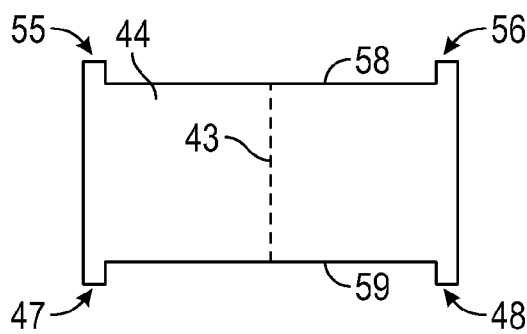
FIGS. 10a-e are front views of a first target side of the urine pads illustrated in FIGS. 1 and 8.
Figure 10B:
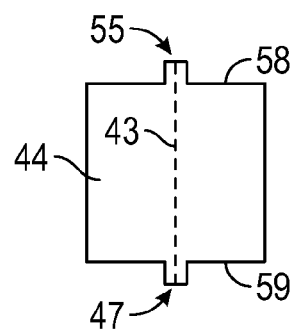
Figure 10C:
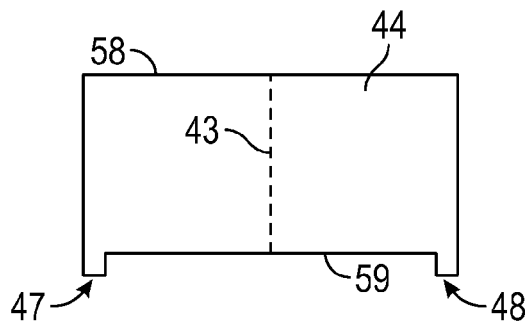
Figure 10D:
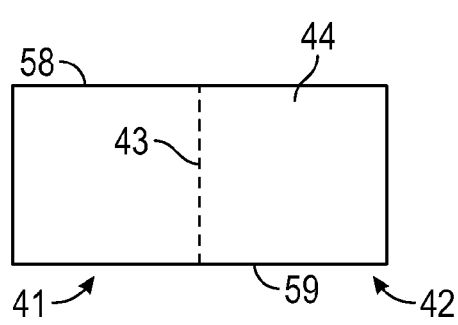
Figure 10E:
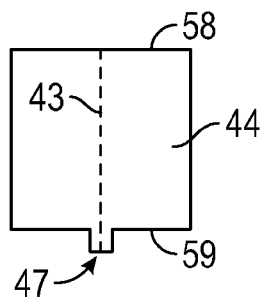
Figure 12A:
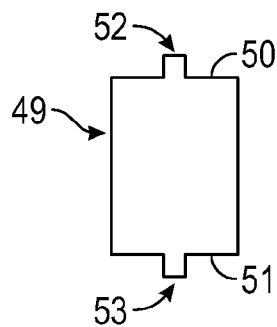
FIGS. 12a-c are front views of a center support member of the urine pads illustrated in FIGS. 1 and 8.
Figure 12B:
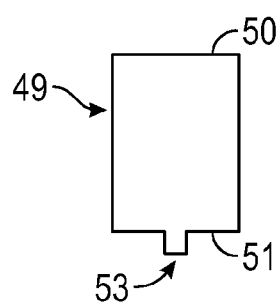
Figure 12C:
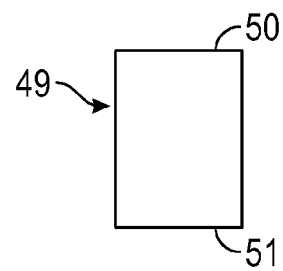

As depicted in FIG. 8, the target structure 40 may have a center support member 49 disposed between a first target side 44 and a second target side 46. The center support member 49 is depicted in FIGS. 12*a-c*. The center support member 49 may have a first center support end 50 affixed along the first horizontal fold line 35. The center support member 49 may have an opposing second center support end 51. When in the functional position, the center support member 49 may extend away from the foundation layer 31, up through the target structure 40. Sides of the center support member 49 connecting the first center support end 50 with the second center support end 51 may contact or support the first target side 44 or the second target side 46 of the target structure 40 as depicted in FIGS. 8 and 9. In the embodiment depicted in FIG. 6A, although not shown, the first center support end 50 may support the first and second target side top ends 58, 60. When in the storage position, the center support member 49 may lay in the same plane as the foundation layer 31 in its folded configuration.

As depicted in FIGS. 12*a-c*, the center support member 49 may have a first center support tab 52 affixed to the first center support end 50. The first center support tab 52 may be secured to the foundation layer 31. When so secured, the first center support tab 52 may extend at a 90° angle with respect to the center support member 49. A second center support tab 53 may be affixed to the second center support end 51. The second center support tab 53 may be affixed to a top member 54, as depicted in FIG. 1. The second center support tab 53 may be affixed to the first or second target side 44, 46, when a center support member 49 is used in a configuration as depicted in FIG. 6A.

Figure 13A:
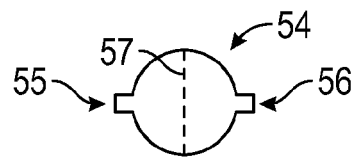
FIGS. 13a-c are front views of a top member of the urine pads illustrated in FIGS. 1 and 8.
Figure 13B:
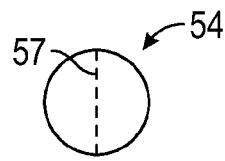
Figure 13C:
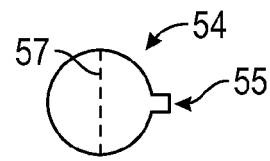

As depicted in FIGS. 13*a-c*, the top member 54 may have a first top member tab 55 and a second top member tab 56.

The first top member tab may extend at a 90° angle with respect to the top member 54 and be secured to a first side 44. The second top member tab may extend at a 90° angle with respect to the top member 54 and secure to a second side 46. The midpoint of the first top member tab 55 may be parallel to the midpoint of the second top member tab 56 when both tabs 55, 56 are secured to the sides of the target structure 40.

In one embodiment as depicted by FIGS. 10a, 10b, 11a, and 11b, the first and second top member tabs 55, 56 may be disposed on the first and second sides 44, 46. In such an embodiment, the first top member tab 55 and the second top member tab 56 may extend at a 90° angle with respect to the target side to which the tab is attached. The tabs may connect to the top member 54.

In embodiments utilizing a top member 54, the top member 54 may extend across the first horizontal fold line 35. A second horizontal fold line 57 may be disposed along the top member 54. The second horizontal fold line 57 may be disposed along a midline of the top member 54. The second horizontal fold line 57 may be aligned with and parallel to the first horizontal fold line. The first horizontal fold line 35 and the second horizontal fold line 57 may share the same coordinates in the X and Y plane. The second horizontal fold line 57 may be located above the first horizontal fold line 35 in the Z direction. In embodiments not utilizing a top member 54, a second horizontal fold line 57 may be disposed at the connection of the first target side top end 58 with the second target side top end 60.

The target structure 40 may be made from, or covered by, an absorbent material. The target structure 40 may be made from the same material as the absorbent covering 33 or the absorbent pad 34. The target structure 40 may be made from a non-absorbent material and covered by an absorbent material. The material covering the target structure 40 may be the same material as the absorbent covering 33 or the absorbent pad 34.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A urine pad comprising:
   a foundation layer having a first horizontal fold line to divide the foundation layer into a first part and a second part, wherein the foundation layer further comprises:
   an impermeable backing, and
   an absorbent covering, having a first anchor point on the first part and a second anchor point on the second part, affixed to the impermeable backing; and
   an automatically deployable target structure having an open length centered on and extending across the first horizontal fold line, a first attachment point, and a second attachment point, wherein the first attachment point is attached to the first part at the first anchor point essentially one half the open length from the first horizontal fold line and the second attachment point is attached to the second part at the second anchor point disposed essentially the open length away from the first anchor point, wherein the automatically deployable target structure is constructed from an absorbent material;
   wherein the automatically deployable target structure is configured to be placed in a storage position when the foundation layer is in a folded configuration and the automatically deployable target structure is configured to be placed in a functional position when the foundation layer is in an open configuration;
   wherein the automatically deployable target structure remains attached to the foundation layer as the automatically deployable target structure automatically deploys from the storage position to the functional position as the foundation layer is unfolded from the folded configuration to the open configuration.

2. The urine pad of claim 1 wherein the target structure further comprises a first vertical fold line aligned with the first horizontal fold line.

3. The urine pad of claim 1 wherein the target structure further comprises opposing, parallel first and second vertical fold lines extending perpendicular to the first horizontal fold line when the foundation layer is in the open configuration.

4. The urine pad of claim 1 wherein the first attachment point further comprises a first target tab and wherein the second attachment point further comprises a second target tab.

5. The urine pad of claim 1 further comprising:
   a center support member having a first center support end affixed along the first horizontal fold line and an opposing second center support end extending away from the foundation layer.

6. The urine pad of claim 5 further comprising:
   a first center support tab disposed on the first center support end, affixed to the foundation layer, and extending from the center support member at essentially a 90 degree angle when the urine pad is in an open configuration.

7. The urine pad of claim 1 further comprising:
   a top member affixed to a top end of the target structure and extending across the first horizontal fold line.

8. The urine pad of claim 7 wherein the top member further comprises a top member tab affixed to the top end of the target structure.

9. The urine pad of claim 7 wherein the top member is affixed to a first top member tab extending from the top end of the target structure.

10. The urine pad of claim 7 further comprising:
a second horizontal fold line disposed along a midline of the top member, parallel to and aligned with the first horizontal fold line.

11. The urine pad of claim 10 wherein the target further comprises:
a first target side with a first target side top end and a first target side bottom end affixed to the first anchor point;
a second target side with a second target side bottom end affixed to the second anchor point and affixed to the first target side top end at the second horizontal fold line.

12. The urine pad of claim 1 further comprising:
a second horizontal fold line disposed on the target, parallel to and aligned with the first horizontal fold line.

13. The urine pad of claim 12 further comprising:
a first target tab disposed on the first target side bottom end and affixed to the first anchor point; and
a second target tab disposed on the second target side bottom end and affixed to the second anchor point.

14. A urine pad comprising:
a foundation layer having a first horizontal fold line to divide the foundation layer into a first part and a second part, wherein the foundation layer further comprises:
a plastic backing,
an absorbent pad disposed on the plastic backing, and
an absorbent covering disposed adjacent to the absorbent pad and over the entirety of the absorbent pad,
wherein the absorbent covering is affixed to the plastic backing and has a first anchor point on the first part and a second anchor point on the second part; and
an automatically deployable target structure having an open length centered on and extending perpendicularly across the first horizontal fold line, wherein the automatically deployable target structure further comprises:
a first target side having a first target side top end and a first target side bottom end,
a second target side having a second target side bottom end, affixed to the first target side,
a top member affixed to the first target side top end and the second target side top and extending across the first horizontal fold line,
a first attachment point affixed to the first target side bottom end, and
a second attachment point affixed to the second target side bottom end, wherein the first attachment point is attached to the first part at the first anchor point essentially one half the open length from the first horizontal fold line and the second attachment point is attached to the second part at the second anchor point disposed essentially the open length away from the first anchor point, wherein the automatically deployable target structure is constructed from an absorbent material;
wherein the automatically deployable target structure remains attached to the foundation layer as the automatically deployable target structure automatically deploys from a storage position to a functional position as the foundation layer is unfolded from a folded configuration to an open configuration.

15. The urine pad of claim 14 wherein the target structure further comprises opposing, parallel first and second vertical fold lines extending perpendicular to the first horizontal fold line when the urine pad is in an open configuration.

16. The urine pad of claim 14 further comprising:
a center support member having a first center support end affixed along the first horizontal fold line and an opposing second center support end extending away from the foundation layer, wherein a first center support tab is disposed on the first center support end and affixed to the foundation layer.

17. The urine pad of claim 14 wherein the top member further comprises a top member tab affixed to the first target side top end.

18. The urine pad of claim 14 further comprising:
a second horizontal fold line disposed along a midline of the top member, parallel to and aligned with the first horizontal fold line.

19. The urine pad of claim 14 further comprising:
a first target tab disposed on the first target side bottom end and affixed to the first anchor point; and
a second target tab disposed on the second target side bottom end and affixed to the second anchor point.

20. A urine pad comprising:
a foundation layer having a first horizontal fold line to divide the foundation layer into a first part and a second part, wherein the foundation layer further comprises:
a plastic backing,
an absorbent pad disposed on the plastic backing, and
an absorbent covering disposed adjacent to the absorbent pad and over the entirety of the absorbent pad,
wherein the absorbent covering is affixed to the plastic backing and has a first anchor point on the first part and a second anchor point on the second part; and
an automatically deployable target structure having an open length centered on and extending perpendicularly across the first horizontal fold line and a second fold line aligned with the first horizontal fold line, wherein the automatically deployable target structure further comprises:
a first target side having a first target side top end and a first target side bottom end,
a second target side having a second target side bottom end, affixed to the first target side top end at the second horizontal fold line,
a first target tab affixed to the first target side bottom end,
a second target tab affixed to the second target side bottom end, wherein the first target tab is attached to the first part at the first anchor point essentially one half the open length from the first horizontal fold line and the second target tab is attached to the second part at the second anchor point disposed essentially the open length away from the first anchor point;
wherein the automatically deployable target structure remains attached to the foundation layer as the automatically deployable target structure automatically deploys from a storage position to a functional position as the foundation layer is unfolded from a folded configuration to an open configuration.

* * * * *